US008644360B2

(12) United States Patent
Liu (10) Patent No.: US 8,644,360 B2
(45) Date of Patent: Feb. 4, 2014

(54) SYSTEM AND METHOD FOR TRANSMITTING AND RECEIVING ULTRA WIDE BAND PULSE OR PULSE SEQUENCE (76) Inventor: Boan Liu, Beijing (CN)

( * ) Notice: Subject to any disclaimer, the term of this patent is extended or adjusted under 35 U.S.C. 154(b) by 575 days.

(21) Appl. No.: 12/678,356

(22) PCT Filed: Sep. 10, 2008

(86) PCT No.: PCT/CN2008/001600
§ 371 (c)(1),
(2), (4) Date: Mar. 16, 2010

(87) PCT Pub. No.: WO2009/049468
PCT Pub. Date: Apr. 23, 2009

(65) Prior Publication Data
US 2010/0195699 A1 Aug. 5, 2010

(30) Foreign Application Priority Data
Sep. 21, 2007 (CN) .......................... 2007 1 0151835

(51) Int. Cl.
H04B 1/00 (2006.01)
(52) U.S. Cl.
USPC ............ 375/130; 375/237; 375/238; 375/239
(58) Field of Classification Search
USPC .................. 375/130, 237, 238, 239
See application file for complete search history.

(56) References Cited

U.S. PATENT DOCUMENTS 6,850,733 B2 * 2/2005 McCorkle et al. ............ 455/41.2
6,985,532 B2 * 1/2006 Batra et al. .................... 375/245

(Continued)

FOREIGN PATENT DOCUMENTS

CN 1531217 A 9/2004
CN 1698283 A 11/2005
CN 1698331 A 11/2005

OTHER PUBLICATIONS

International Search Report dated Dec. 18, 2008, issued in corresponding international application No. PCT/CN2008/001600.

(Continued)

Primary Examiner — Shuwang Liu
Assistant Examiner — Sung Ahn
(74) Attorney, Agent, or Firm — Ostrolenk Faber LLP (57) ABSTRACT The present invention provides a method for transmitting and receiving ultra wide band (UWB) signals. By this method, application systems such as wireless UWB communication, wireless UWB positioning and UWB target detecting radar can be achieved. In this method, an UWB device periodically generates pulse signals. In each pulse repetition period, an output signal can be a positive-polarity pulse (positive pulse), or a negative-polarity pulse (negative pulse), or an empty signal (empty signal) without any change. A method of UWB device controlling the output signal to shift between the positive pulse, negative pulse and empty signal is very simple and easy to implement. A transmitter can transmit any variable pulse sequence (the arranging order of the positive pulse, negative pulse and empty signal; the length of the sequence). One or more definite pulse sequences are used to constitute wireless information frame according to certain rules, and functions such as communications, positioning and target detection between one or more transmitters and one or more receivers can be realized. The prevent invention provides a method for generating UWB signals, as well as a low-cost and a high-performance UWB signal receiving method. According to the UWB signal generating and receiving method disclosed in the present invention, the system can very conveniently change (by software control) a central frequency and signal bandwidth of the UWB signals, and therefore can satisfy application requirements in different fields. A plurality of such transceivers can simultaneously work at the same waveband or different wavebands.

15 Claims, 11 Drawing Sheets

(56) References Cited

U.S. PATENT DOCUMENTS

| | | | |
|---|---|---|---|
| 7,002,470 B1* | 2/2006 | Miao | 340/539.22 |
| 7,283,595 B2* | 10/2007 | Jun | 375/295 |
| 7,664,161 B2* | 2/2010 | Norimatsu et al. | 375/130 |
| 2003/0232612 A1* | 12/2003 | Richards et al. | 455/323 |
| 2004/0071249 A1* | 4/2004 | Schell | 375/371 |
| 2004/0165686 A1* | 8/2004 | Siwiak | 375/350 |
| 2004/0165689 A1* | 8/2004 | Akopian et al. | 375/371 |
| 2005/0105594 A1* | 5/2005 | Giannakis et al. | 375/132 |
| 2005/0213635 A1* | 9/2005 | Terada et al. | 375/130 |
| 2006/0039447 A1 | 2/2006 | Sahinoglu et al. | |
| 2006/0129410 A1* | 6/2006 | Reisenfeld et al. | 704/278 |
| 2006/0209922 A1 | 9/2006 | Sahinoglu et al. | |
| 2007/0060079 A1* | 3/2007 | Nakagawa et al. | 455/131 |
| 2007/0098044 A1* | 5/2007 | Kim et al. | 375/130 |
| 2008/0037665 A1* | 2/2008 | Maeki et al. | 375/260 |
| 2008/0279287 A1* | 11/2008 | Asahina | 375/242 |
| 2009/0252259 A1* | 10/2009 | Ikeda | 375/340 |
| 2010/0277208 A1* | 11/2010 | Fullerton et al. | 327/129 |

OTHER PUBLICATIONS

C.E. Shannon, "A Mathematical Theory of Communication", *The Bell System Technical Journal*, vol. 27, pp. 379-423 and 623-656 (1948).

* cited by examiner

Fig. 13 ived UWB signals. The method is based on pulses or pulse sequences.

SYSTEM AND METHOD FOR TRANSMITTING AND RECEIVING ULTRA WIDE BAND PULSE OR PULSE SEQUENCE

CROSS REFERENCE TO RELATED APPLICATIONS

The present application is a 35 U.S.C. §371 National Phase conversion of PCT/CN2008/001600, filed Sep. 10, 2008, which claims benefit of Chinese Application No. 200710151835.7, filed Sep. 21, 2007, the disclosure of which is incorporated herein by reference. The PCT International Application was published in the Chinese language.

TECHNICAL FIELD

The present invention generally relates to wireless communication systems, wireless positioning systems, target detecting radar systems and the similar, such as an ultra wide band (UWB) system, comprising a mobile transceiver, a centralized transceiver and related apparatuses. Specifically, the present invention relates to technologies such as using UWB pulse sequence signals to transmit information between two UWB wireless transceivers, measuring a relative distance between two or more UWB wireless transceivers, using one or more UWB wireless transmitters to transmit signals and meanwhile using one or more UWB wireless receivers to receive signals for target detection.

BACKGROUND ART

Since radio technology appeared in the world in 1896, demands for radio communication apparatus have interacted with development of radio communication technologies. Performances of radio communication devices have been constantly improved, and meanwhile an unprecedentedly high requirement for radio communication technology has been raised. In 1948 Claud Shannon proposed a theoretical extremity [ref] of radio communication system performances, which is well-known Shannon Theorem or Shannon formula:

$C = W * \text{Log}_2(1+S/N)$  Formula 1: formula of Shannon Theorem

In the Formula 1, C denotes a theoretically achievable error-free extreme data transmission rate and is in an unit of bit per second (bps), W denotes a frequency band width occupied by the signals and is in an unit of Hetz (Hz). S/N denotes a signal to noise ration (SNR).

Shannon Theorem provides a theoretical extremity of radio communication system performances. Besides, if radio signals are used for positioning and target detection, the frequency band width of the radio signals is in inverse proportion to a time resolution of the system. Radio systems are generally approximately classified into narrow band systems, wide band systems and ultra wide band systems which definitions are respectively expressed in the following Formula 2, Formula 3 and Formula 4:

$(f_H - f_L)/f_M \leq 1\%$  Formula 2: Definition of narrow band radio systems $1\% \leq (f_H - f_L)/f_M \leq 25\%$  Formula 3: Definition of wide band radio system $(f_H - f_L)/f_M \geq 25\%$ or $(f_H - f_L) \geq 500\text{MHz}$ Formula 4: Definition of an ultra wide band radio system The currently used radio systems are almost all narrow band and wide band systems. We hope to provide an UWB radio transceiver system based on pulses or pulse sequences, which can carry out operations such as radio data communication, radio positioning and radio target detection. Meanwhile, for different application demands and requirements of different regions for signal spectrum and control of transmission power, this system can dynamically configure parameters of the system such as signal central frequency, signal frequency band width and signal transmission power through a control interface of the system.

BRIEF DESCRIPTION OF THE ACCOMPANYING DRAWINGS

A brief introduction of the accompanying drawings of the description is made first hereunder, and then embodiments of the present invention are described with reference to these accompanying drawings to illustrate principles and advantages of the present invention.

In the following drawings and description, the same reference number denotes the same device or a device with the similar function.

In the drawings.

The portion in the dotted line block of FIG. 2 is a structure diagram showing an UWB transmission radio frequency front end (0012) designed according to a preferred embodiment of the present invention.

The portion in the dotted line block of FIG. 3 is a structure diagram showing an UWB signal generator (0013) designed according to a preferred embodiment of the present invention.

The portion in the dotted line block of FIG. 4 is a block diagram showing an UWB signal controller (0014) designed according to a preferred embodiment of the present invention.

The portion in the dotted line block of FIG. 5 is a structure diagram showing an UWB receiver radio frequency front end (0022) designed according to a preferred embodiment of the present invention.

The portion in the dotted line block of FIG. 6 is a structure diagram showing an UWB correlation receiver (0023) designed according to a preferred embodiment of the present invention.

DETAILED DESCRIPTION OF THE PREFERRED EMBODIMENTS

The present invention mainly relates to a method for generating an UWB signal and a method for receiving preprocessing. The UWB signal herein is a cyclically generated pulse signal. In each cycle, a positive pulse signal (positive pulse) is generated or a negative pulse signal (negative pulse) is generated or a neither positive nor negative pulse (empty signal) is generated. Therefore, the method for generating the UWB signals described hereunder is a method for generating a pulse sequence wherein the positive pulse, the negative pulse and the empty signal are arbitrarily arranged. The method for receiving preprocessing refers to processing the received pulse UWB signals. The present invention provides a cost-efficient correlation receiving method and a high-performance correlation receiving method. By these methods, the RF pulse UWB signal is converted into a digital baseband signal, and a subsequent baseband processor can carry out further processing to obtain information such as data, positioning and targets.

Figure 1:
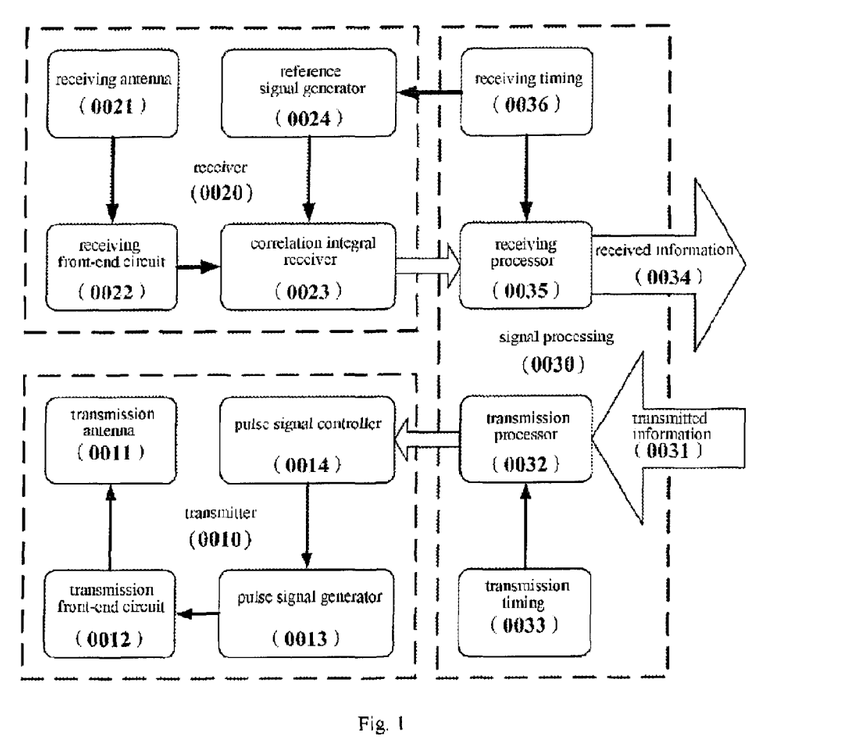
FIG. 1 is a structure diagram showing an ultra wide band (UWB) transceiver system designed according to a preferred embodiment of the present invention.

FIG. 1 is a structure diagram showing an ultra wide band (UWB) transceiver system designed according to a preferred embodiment of the present invention. The UWB transceiver consists of three basic parts: a transmitter (0010), a receiver (0020) and a signal processor (0030). The transmitter comprises a transmitting antenna (0011), a transmission radio frequency front end circuit (0012), a pulse signal generator (0013) and a pulse signal controller (0014). The receiver comprises a receiving antenna (0021), a receiving radio frequency front end circuit (0022), a correlation integral receiver (0023) and a reference signal generator (0024). The transmitting antenna and the receiving antenna can be two antennas or the same antenna wherein a transceiving switch decides whether the antenna is in a transmitting or receiving state. The signal processing circuit mainly comprises a transmission processor (0032), a transmission timing (0033), a receiving processor (0035) and a receiving timing (0036).

In regard to a radio system, a signal transmitting mode decides a basic structure of the system. Because a signal receiving mode varies in an extremely limited scope, signal transmitting modes are only given in physical layer (PHY) standards or protocols of the various current wireless antenna systems, and the signal receiving mode is decided by a designer of the system on his own, which is sufficient to ensure inter-communication and interconnection between apparatuses produced by different manufacturers. The signal transmitting mode of the present invention is first introduced hereunder, and then an optimized signal receiving mode is introduced.

To-be-transmitted information (0031) transmitted from an upper layer of the system takes information frame (data frame or timing frame) as an unit. The information frame can either be un-intermittently and continuously sent or sent intermittently at a regular time or at random. The data frame can be the transmitted data or can be considered as a timing (distance-measuring) mark; timing frame does not contain data or contains little data as timing (distance-measuring) mark. Like other wireless communications system, the information frame comprises a frame header and a frame body which are both a digital electrical level signal and converted into a transmission control signal after being processed by the transmission processor (0032) (encoding including error correction encoding or (and) spreading encoding or (and) modulation encoding). These transmission control signals must contain information about whether to transmit a pulse sequence and about a form of sending the pulse signal (positive pulse or negative pulse or empty signal) in the current pulse repetition period T upon transmitting the pulse sequence. The control signals are sent to the transmitter to control the transmission of the UWB pulse signals.

Figure 4:
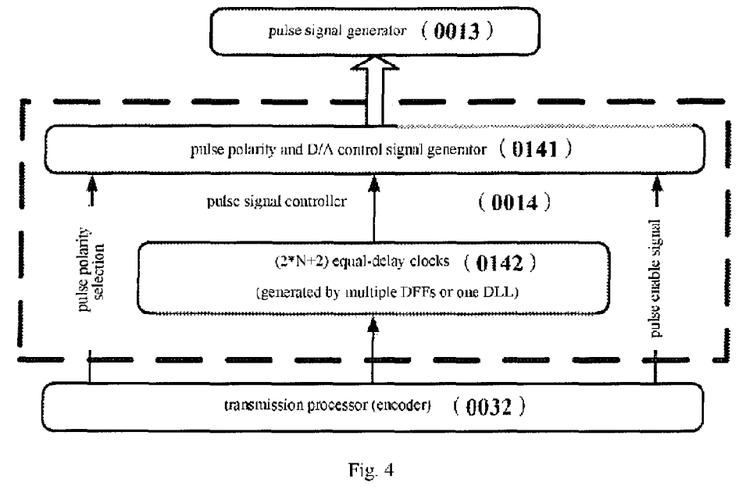

The pulse signal controller (0014 in FIG. 4) generates 2*N+2 digital signals and corresponding status signal under control of the transmission control signals and the transmission timing signals sent from the transmission processor (0032), wherein 2*N+1 signals are used to control an output polarity of 2*N+1 weighted D/A converter. If a pulse needs to be transmitted, the 2*N+1 pulses respectively reverse the output polarity once at the offset locations (0, D, 2*D, . . . , N*D, . . . , 2*N*D) of the current time X*T (X is any positive integer and denotes a pulse number of the currently transmitted pulse sequence). The polarity of the output pulse is decided by the 2*N+2th signal. If the polarity of the pulse to be transmitted next is the same as the polarity of the currently transmitted pulse, this signal needs to reverse the output polarity once (X*T+(2*N+1)*D is the optimal time for reversing the output polarity) after the current pulse transmission ends and before next pulse transmission begins. If the currently transmitted pulse is an empty signal, all the signals needn't to be reversed. A minimum repetition period of the pulse signal is $T_{min}=(2*N+2)*D$. Generation of the above 2*N+2 signals requires the period to be greater than $T_{min}$, and adjacent time delay is 2*N+2 multiple clock signals of D. Circuits for generating multiple clock signals can be a shift register (applicable for a low frequency system), a delay lock loop (applicable for a high frequency system) or other methods. Time delay D decides a central frequency ($f_M=0.5/D$) of the pulse signal: the greater D is, the lower the central frequency is; the less D is, the higher the central frequency is. N is a positive integer with a minimum value 1. N decides the bandwidth ($f_H-f_L$) of the pulse signal: the greater N is, the less the signal bandwidth is; the less N is, the greater the signal bandwidth is.

Figure 3:
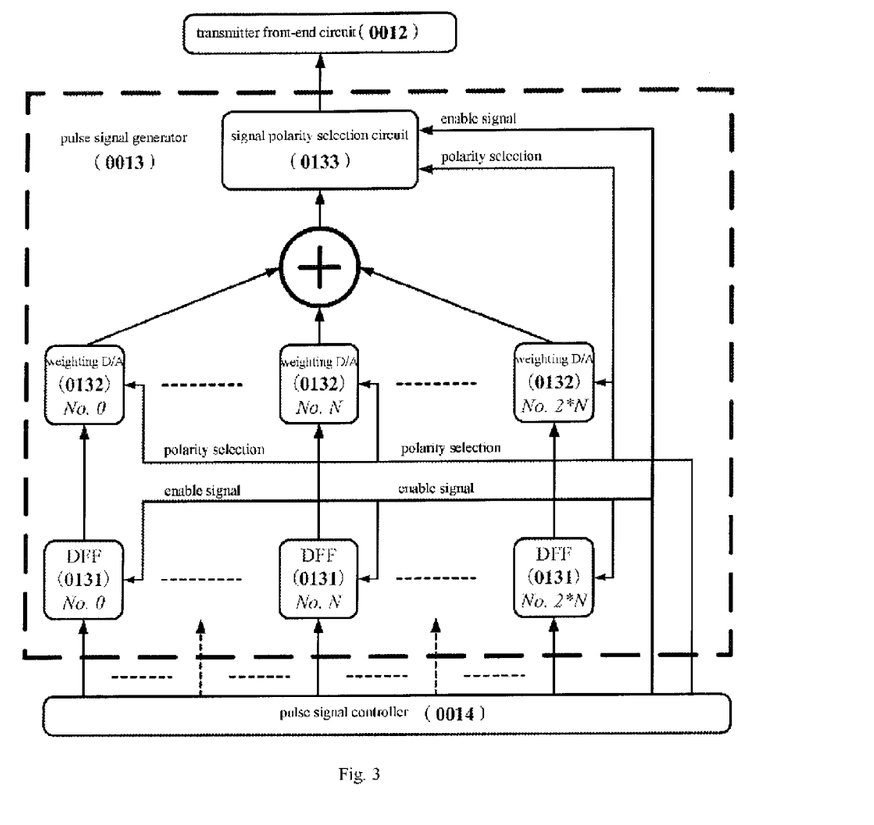
Figure 7:
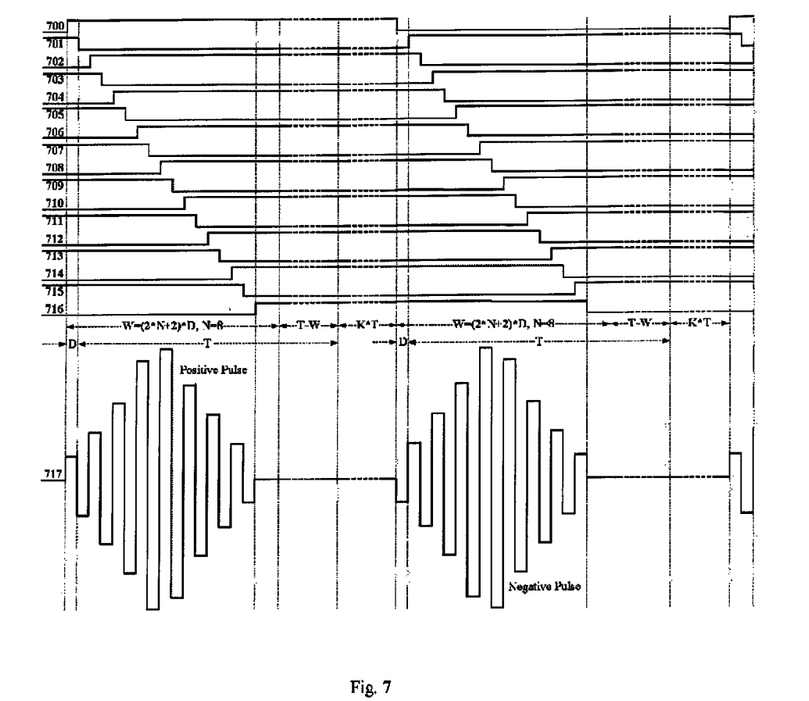
FIG. 7 shows time sequence and waveform of key signals of the UWB transmitter designed according to a preferred embodiment of the present invention.

The pulse signal generator (0013 in FIG. 3) makes a summation from the output of the 2*N+1 weighted D/A converter under control of the digital signals sent from the pulse signal controller (0014 in FIG. 4) to generate a pulse sequence signal with alternating positive polarity and negative polarity. The positive-negative alternating pulse signals are converted by a polarity selection switch into any pulse sequence (positive pulse, negative pulse, null pulse). FIG. 7 shows time sequence and waveform of key signals of the transmitter designed according to a preferred embodiment of the present invention. In this preferred embodiment, N is 8. Signals (700, 701, . . . 708, . . . , 716) in FIG. 7 are respectively 2*8+1=17 output signals of the weighted D/A converter, and the signal (717) is a schematic view of pulse signals generated by weighting and summation.

Amplitudes of signals (700, 701, . . . , 708, . . . , 716) in FIG. 7 are decided by a selected pulse envelope function which is generally a bell shaped function. A central amplitude value of a normalized pulse envelope function is 1, the amplitude forwardly or backwardly from the center respectively attenuates smoothly from 1 to an enough small quantity &, the amplitude of the signals (700, 701, . . . , 708) smoothly increases from the small quantity & to 1. The amplitude of the signals (708, 709, . . . , 716) smoothly attenuates from 1 to the small quantity &. The pulse envelope function can either be a Gaussian function or other bell-shaped functions.

Figure 10:
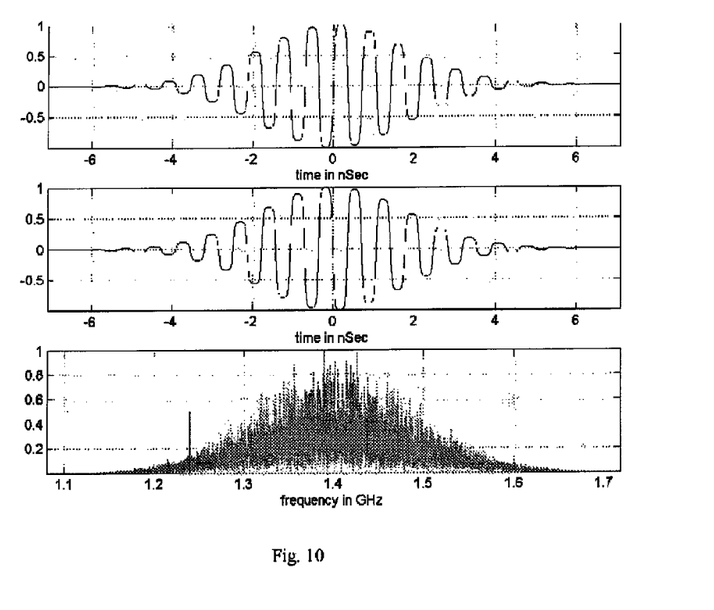
FIG. 10 shows an UWB signal waveform and spectral distribution of a 1-2 GHz frequency band according to a preferred embodiment of the present invention, wherein a pulse width is about 14.2 ns and a signal width is about 320 MHz.
Figure 11:
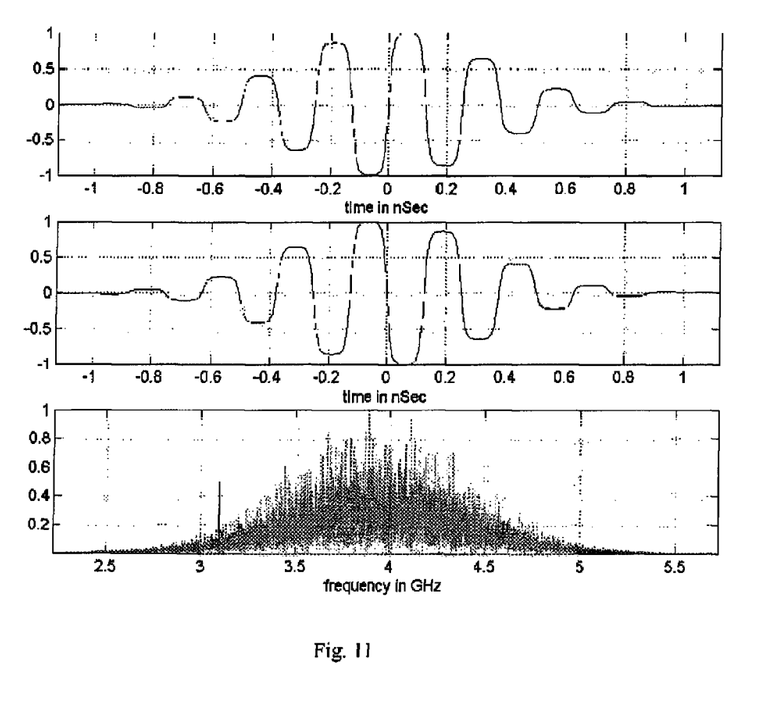
FIG. 11 shows an UWB signal waveform and spectral distribution of a 3-5 GHz frequency band according to a preferred embodiment of the present invention, wherein a pulse width is about 2.25 ns and a signal width is about 1.75 GHz.
Figure 12:
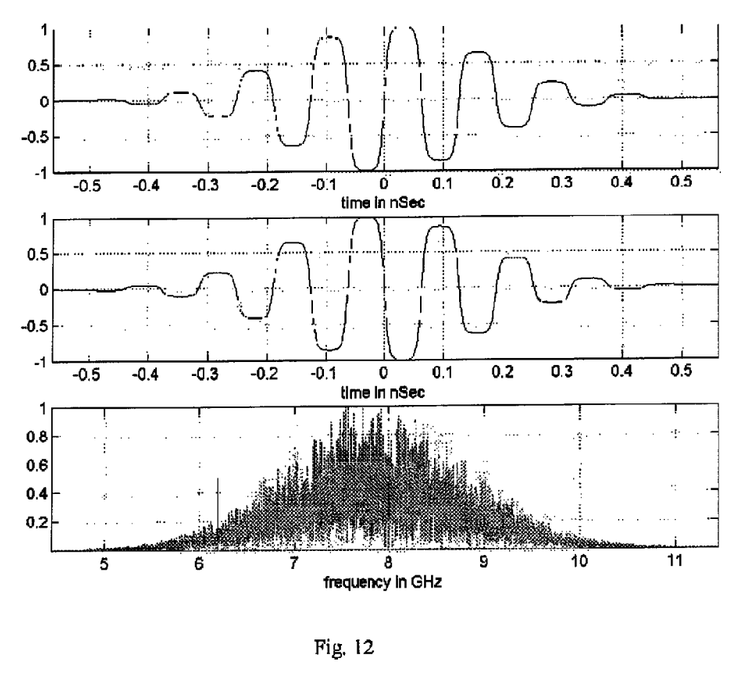
FIG. 12 shows an UWB signal waveform and spectral distribution of a 6-10 GHz frequency band according to a preferred embodiment of the present invention, wherein a pulse width is about 1.125 ns and a signal width is about 3.5 GHz.
Figure 13:
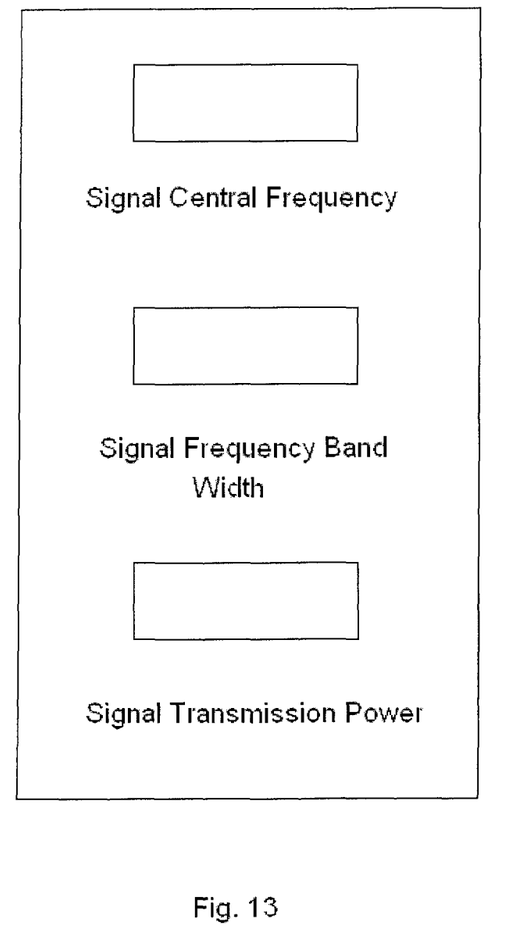
FIG. 13 shows a control interface.

FIG. 10, FIG. 11 and FIG. 12 show a waveform and its spectrum of the pulse signal generated by using the Gaussian function as the envelope function. System parameters generating the signal as shown in FIG. 10 are N=19 and D=355 ps, a minimum pulse repetition period Tmin=14.2 ns, and signal bandwidth is approximately 320 MHz. System parameters generating the signal as shown in FIG. 11 are N=8 and D=125 ps, a minimum pulse repetition period Tmin=2.25 ns, and signal bandwidth is approximately 1.75 GHz. System parameters generating the signal as shown in FIG. 12 are N=8 and D=62.5 ps, a minimum pulse repetition period Tmin=1.125 ns, and signal bandwidth is approximately 3.5 GHz.

Figure 2:
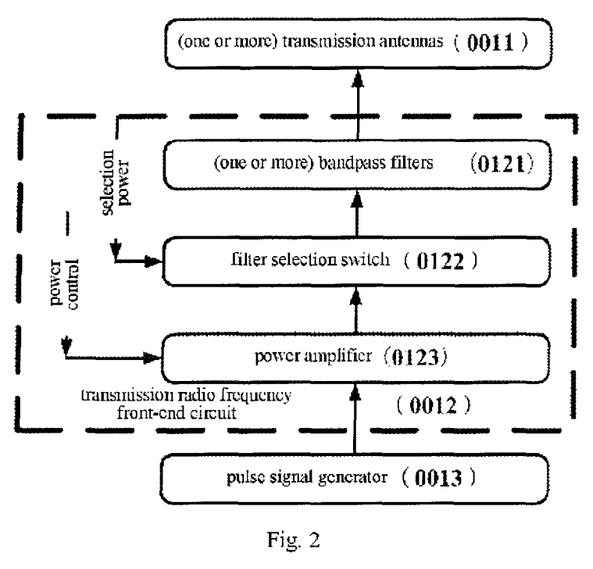

The transmission radio frequency front end circuit (0012 as shown in FIG. 2) carries out digital control and variable power amplification of the UWB pulse signal generated by the pulse signal generator (0013) (selection of a transmitting power) and then filters out-of-band noise via a bandpass filter (to reduce interference with other wireless systems). And finally the signal is transmitted out by the transmitting antenna (0011). The parameters N and D of the UWB transceiver according to the present invention are dynamically variable, that is, if needed, an application system can dynamically select a central frequency and frequency band width of the signal according to the needs. Therefore, the system might need a radio frequency electronic switch to select a bandpass filter and a transmitting antenna.

The UWB signal received by the receiving antenna (0021) is firstly sent to the receiving front end circuit for processing. The receiving antenna can be a passive antenna or active antenna. The active antenna itself carries a low noise amplifier (LNA) so that the receiver can operate at a lower signal to noise ratio (SNR). The signal received by the antenna needs to be filtered by the bandpass filter (0221) to remove the out-of-band interference, and then is subjected to further processing. Like the transmitter, the receiver might need to employ a radio frequency electronic switch to select different bandpass filters and receiving antennas. If the transmitter and the receiver share the bandpass filter and the antenna, a radio frequency electronic switch arrangement system needs to be employed to execute transmission or receiving.

Figure 5:
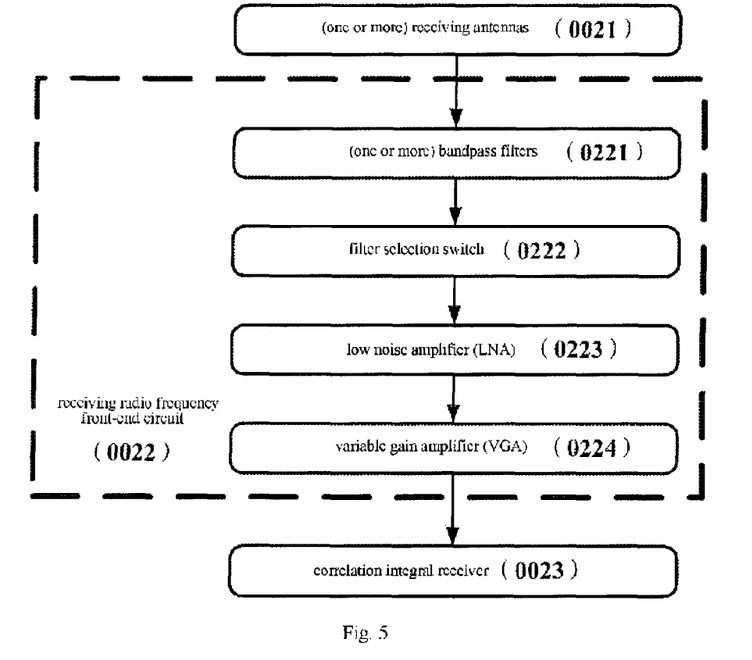

The receiving radio frequency front-end circuit (0022) mainly comprises three parts: a bandpass filter (0221) and a filter selection switch (0222), a low noise amplifier (LNA) (0223) and a variable gain amplifier (VGA) (0224). LNA functions to reduce a noise coefficient of the system and improve the system performances. VGA functions to allow the amplitude of the input signal of the subsequent circuit always to approach maximum input signal amplitude as much as possible to maintain a dynamic range of the system.

Figure 6:
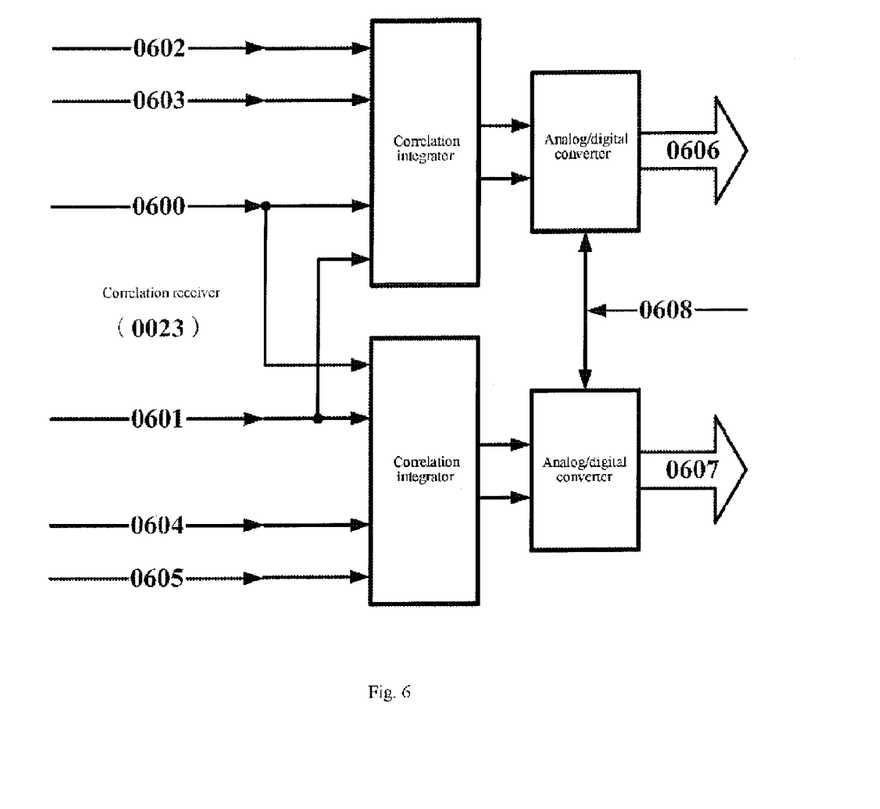

The correlation integral receiver (0023) is a key component of the UWB wireless receiver. It is a well-known method that a four-quadrant analog multiplier carries out correlation computing of the received signal and the reference signal generated locally. The method of the present invention differs from other methods mainly at two aspects: 1) it uses two local reference signals I and Q as a set for correlation integral, wherein I and Q signals have the same waveform, but there is a time delay of D/2 between the two signals; 2) it uses a set of continuous waves or multiple sets of pulse waves as the local reference signal for correlation integral. One set of continuous wave reference signal is square wave or sinusoidal wave I and Q signals with a D*2 period. One set of pulse wave reference signal is pulse I and Q signals with a weighted time delay D and a repetition period T=D*(2*N+2). The time delay between two adjacent sets of pulse wave reference signals is D. The pulse wave I and Q signals can be signals with positive polarity pulse and negative polarity pulse alternated, or can be signals that all are positive polarity pulse signals or negative polarity pulse signals after being selected by a polarity selection switch.

Figure 8:
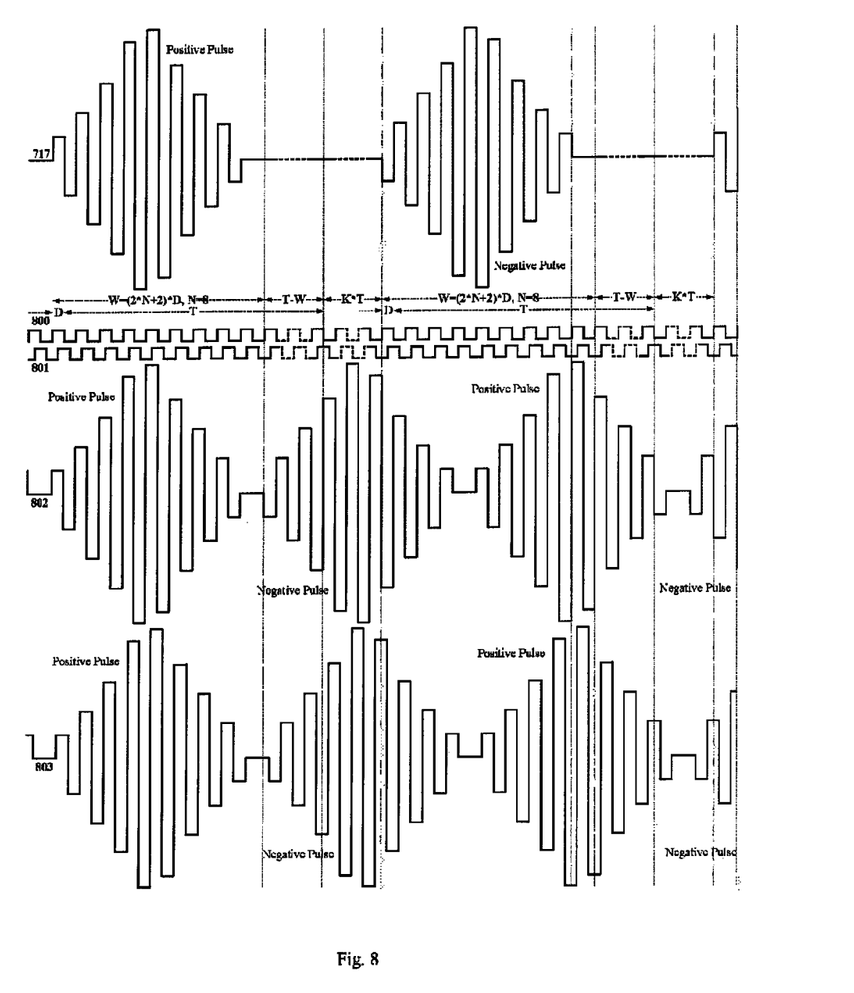
FIG. 8 shows a time sequence and a waveform of key signals of the UWB receiver designed according to a preferred embodiment of the present invention.
Figure 9:
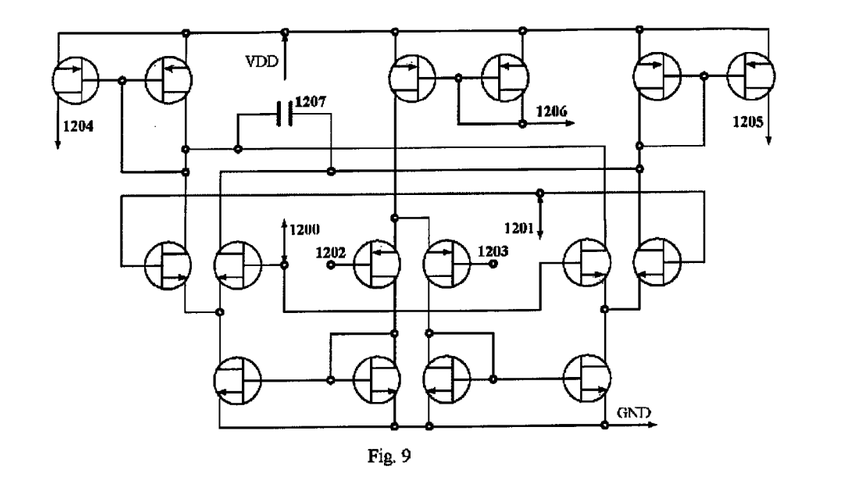
FIG. 9 shows a correlation receiver circuit of the UWB receiver designed according to a preferred embodiment of the present invention.

FIG. 8 shows a time sequence and a waveform of key signals of the transmitter according to a preferred embodiment of the present invention. The signal (717) is a signal waveform transmitted by the transmitter. Signals (800) and (801) are a set of continuous wave I and Q signals (only square wave is drawn in the figure and sinusoidal wave is not drawn), signals (802) and (803) are a set of pulse wave I and Q signals (only positive polarity-negative polarity alternating pulse signal is drawn in the figure; pulse signals which all are positive polarity or negative polarity are not drawn in the figure). Each receiver requires pulse wave reference signal with a time delay D between adjacent sets of 2*N+2 sets. FIG. 9 is a correlation integrator circuit designed according to a preferred embodiment of the present invention.

A set of continuous wave reference signals is used for correlation integration. The receiver only needs two correlation integrators and two A/D converters, and what is output is a baseband signal modulated by binary phase shift keying (BPSK). A requirement for precision of the analog to digit converters (ADC) is approximately 6 bits. Therefore, a low-cost receiver can be realized, and a drawback thereof is that its multi-path detection capability is not as good as a receiver which employs multiple sets of pulse wave reference signals. Multiple sets of pulse wave reference signals are employed for correlation integration, wherein the receiver requires 2*(2*N+2) correlation integrators and 2*(2*N+2) ADCs, $N \leq 11$ for a $f_H/f_L \approx 1.6$ UWB receiver system, the number of the correlation integrators and ADCs is less than or equal to 48, and a requirement for precision of the ADC is approximately 3 bits. Such a receiver has a very powerful multi-path detection capability, and a system overhead is within an acceptable range. A high-performance communication receiver or a target detection receiver should choose to use multiple sets of pulse waves as reference signals for correlation integration.

If the continuous wave is selected as the reference signal, the reference signal generator (0024) can be composed of a voltage-controlled oscillator and a 90° phase shifter (a sinusoidal wave phase shifter) or D/2 time delayer (a square wave phase shifter, such as a time delay lock loop); if a pulse wave is selected as the reference signal, the reference signal generator (0024) can be the same circuit as the pulse signal generator (0013), wherein the reference signals are pulse signals which all are positive-polarity or negative-polarity or which are positive polarity-negative polarity alternating. The reference signal generator can be a pulse signal generator without a polarity selection switch and a spike elimination circuit, wherein the reference signals are positive polarity-negative polarity alternating pulse signals, and the system requires 2*(2*N+2) pulse signal generators.

The receiving processor (0035) can be a baseband processor of a binary phase shift keying (BPSK) system in any form. When multiple sets (or one set) of pulse wave reference signals are used, a special point is that thoughts should be given to requirements for realization of the baseband processor caused by selection of different reference signals. The pulse reference signals are selected from the following three kinds: 1) all-positive-polarity pulse reference signals, 2) all-negative-polarity pulse reference signals, and 3) positive polarity-negative polarity alternating pulse reference signals.

REFERENCE CITED

C. E. SHANNON, "A Mathematical Theory of Communication", Bell Syst. Techm. J., Vol 27, pp 379-423, July 1948, 623-656, October 1948.

What is claimed is:

1. A method for generating an ultra wide band (UWB) radio frequency pulse sequence, comprising:
   a) Providing a transmission time signal and information to be transmitted to a transmission processor;
   b) Generating, with a signal controller, 2*N+2 digital signals according to the transmission time signal and requirements about whether to transmit pulse received from the transmission processor, wherein, N is an integer with a minimum value of 1;
c) Generating, with a weighted D/A converter, 2*N+1 weighted D/A, equal-delay, signals from the 2*N+2 digital signals, wherein each equal-delay signal has a polarity that is opposite to a polarity of an immediately preceding equal-delay signal and each equal-delay signal is delayed by a time delay D relative to an immediately preceding equal-delay signal;
d) Carrying out, in a pulse signal generator, adjacent summation of the 2*N+1 weighted D/A, equal-delay signals, to generate, a sequence of polarity alternating pulses that constitute the UWB pulse sequence;
wherein each pulse in the UWB pulse sequence has a pulse width defined between a start point and an end point, and wherein the start point is defined at a start point of a weighted D/A signal of one polarity and the end point is defined at a start of another weighted D/A signal of an opposite polarity to the one polarity, the one weighted D/A signal preceding the another weighted D/A signal by a time delay D; and
e) Selecting an output polarity of each UWB pulse according to a polarity requirement of the transmitted pulse.

2. The method according to claim 1, wherein a change rule of an absolute value of the amplitude of the multiple equal-delay polarity reversing signals is decided by a Gauss Function.

3. The method according to claim 2, wherein the change rule of the absolute value of the amplitude of the multiple equal-delay polarity reversing signals is determined by a bell-shaped function.

4. The method according to claim 1, further comprising:
a) Changing the central frequency of the UWB pulse sequence by changing the time-delay difference D with shift registers or time delay lock loops; and
b) Changing N in the value of number 2"N+2 by changing shift registers or delay lock loops so as to change bandwidth of the UWB pulse sequence.

5. The method according to claim 1, further comprising:
a) providing a polarity selection switch; and
b) Converting, with the polarity selection switch, the sequence of polarity alternating pulses into any sequence of pulses that includes a positive pulse, a negative pulse or a null pulse.

6. An ultra wide band (UWB) radio frequency pulse and sequence signals transmitting device, comprising:
a) a signal source that transmits a transmission time signal;
b) a transmission processor that generates, based on the output of the signal source, transmission control signals containing information about whether to transmit a pulse sequence and polarity of pulses in said pulse sequence;
c) a pulse signal controller that generates 2*N+2 digital signals based on transmission control signals received from said transmission processor, wherein N is an integer with a minimum value of 1;
d) a weighted D/A converter that generates 2*N+1 weighted D/A, equal delay signals from the 2*N+2 digital signals, wherein each equal delay signal has a polarity that is opposite to a polarity of an immediately preceding equal-delay signal and each equal delay signal is delayed by a time delay D relative to an immediately preceding equal-delay signal;
e) a pulse signal generator that carries out adjacent summation of the 2*N+1 weighted D/A, equal-delay signals, to generate, a sequence of polarity alternating pulses that constitute the UWB pulse sequence;
wherein each pulse in the UWB pulse sequence has a pulse width defined between a start point and an end point, and wherein the start point is defined at a start point of a weighted D/A signal of one polarity and the end point is defined at a start of another weighted D/A signal of an opposite polarity to the one polarity, the one weighted D/A signal preceding the another weighted D/A signal by a time delay D;
f) a transmitter radio frequency front-end circuit, comprising a power amplifier, bandpass filter and selection switches.

7. A receiving method for an ultra wide band (UWB) pulse signal, comprising:
a) receiving a UWB pulse sequence generated by the method claimed in claim 1;
b) using two continuous and orthogonal sinusoidal waves with a period of D*2 as reference signals, wherein D is a weighted time delay difference;
c) bringing the two reference signals into correlation calculation and correlation integration with the received UWB pulse sequence, respectively.

8. A pulse ultra wide band (UWB) data communication device, comprising:
a) a UWB radio frequency pulse and sequence signals transmitting device as claimed in claim 6;
b) a receiving timing section;
c) a radio frequency front-end, comprising bandpass filters, polarity selection switches, low noise amplifiers, and variable gain amplifiers;
d) a reference signal generator, for generating one or more sets of reference signals based on the reference frequency, wherein the waveform of the signals is of square wave, or sinusoidal wave, or UWB pulse;
e) a correlation integral receivers, for carrying out the correlation integration of the reference signals and the received radio frequency signals;
f) digit converters (ADC) and baseband processors, for demodulating received information and timing.

9. A pulse ultra wide band (UWB) distance-measuring and positioning system, comprising:
a) a UWB radio frequency pulse and sequence signals transmitting device as claimed in claim 6;
b) a receiving timing section;
c) a radio frequency front-end circuit comprising a bandpass filter, a polarity selection switch, a low noise amplifier, and a variable gain amplifier;
d) a reference signal generator to generate a set of reference signals based on a reference frequency, wherein the waveform of the reference signals is of square wave, or sinusoidal wave, or UWB pulse;
e) a correlation integral receiver that carries out correlation integration of the reference signals and received radio frequency signals;
f) an analog to digit converters (ADC) and a baseband processor, for demodulating received information and timing.

10. A pulse ultra wide band (UWB) communication system, comprising:
a) a pulse UWB data communication device as claimed in claim 8; and
b) a control interface.

11. A pulse ultra wide band (UWB) communication system with multiple channel and/or multiple frequency band, comprising:
a) a multiple pulse UWB communication system as claimed in claim 10; wherein each system works in a different frequency band or in a same frequency band.

12. A single-frequency band pulse ultra wide band (UWB) distance-measuring and positioning system, comprising:
   a) a pulse UWB distance-measuring and positioning device as claimed in claim 9; and
   b) a control interface.

13. A pulse ultra wide band (UWB) distance-measuring and positioning system with multiple channel and/or multiple frequency band, comprising:
   a) a multiple single-frequency band pulse UWB distance-measuring and positioning system as claimed in claim 12; wherein each system works in a different frequency band or in a same frequency band.

14. A single-frequency band (UWB) target-detecting system, comprising:
   a) a pulse UWB distance-measuring and positioning device as claimed in claim 9; and
   b) a control interface.

15. A pulse ultra wide band (UWB) target detecting system with multiple channel and/or multiple frequency band, comprising:
   a) a multiple single-frequency band pulse UWB target detecting system as claimed in claim 14; wherein each system works in a different frequency band or in a same frequency band.

* * * * *

UNITED STATES PATENT AND TRADEMARK OFFICE
CERTIFICATE OF CORRECTION

PATENT NO. : 8,644,360 B2
APPLICATION NO. : 12/678356
DATED : February 4, 2014
INVENTOR(S) : Boan Liu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 707 days.

Signed and Sealed this
Twenty-ninth Day of September, 2015

Michelle K. Lee
*Director of the United States Patent and Trademark Office*